May 16, 1961 J. BABAUD 2,984,830

DIGITAL CODE TRANSLATING SYSTEM

Filed Oct. 1, 1957

United States Patent Office 2,984,830

Patented May 16, 1961

2,984,830

DIGITAL CODE TRANSLATING SYSTEM

Jean Babaud, Sceaux, France, assignor to Société à Responsabilité limitée: Ateliers de Construction Beaudouin, a company of France

Filed Oct. 1, 1957, Ser. No. 687,423

Claims priority, application France Mar. 18, 1957

6 Claims. (Cl. 340—347)

This invention relates to digital code systems, and its broad object is to provide an improved system for translating a code of the parallel or series-parallel type into a corresponding serial code.

There are many instances where such translation or conversion is necessary. In many types of digital measuring, indicating and/or control systems where one or more physical magnitudes are to be recorded on a suitable record medium such as photographic film, magnetic tape or drum, perforated or printed paper tape, or the like, it is convenient to record each successive value of the magnitude as a set of parallel code elements or "bits" displaced transversely across the film or tape, while the codes or "words" representing the successive values of the magnitude are displaced longitudinally along the film or tape. Where more than one simultaneously varying magnitudes are to be recorded, the respective values simultaneously assumed by the different magnitudes at a given time are all recorded as parallel words in transversely displaced relation across the tape, the tape then including as many longitudinal channels as there are different magnitudes involved.

Thus, assuming the code used requires $n$ code elements to represent each value of a magnitude, i.e. each word consists of $n$ elements, then in case there are $p$ simultaneously variable magnitudes to be recorded, there will be $np$ code elements or bits entered in parallel across each section of tape, spaced transversely of the tape.

When a record of the above character is to be utilized, it is generally necessary to convert the parallel code indications thereon into corresponding serial code indications. For example, it may be desired to have the output of the reading unit operate printing or perforating devices to produce a printed tabulated list of the recorded magnitude values in the form of decimal numbers, or to produce a set of punched cards representing such numbers. Or again, the reading unit may be required to store the values directly into the memory of a digital computer. Most types of utilization apparatus, such as printing and card punching units, require a serial input of data. Even where the output apparatus, such as some types of computer, does admit of a parallel or series-parallel data input into it, the use of a parallel reading system possesses various drawbacks. For one thing, the use of a plurality of stationary reading or scanning heads disposed across the record medium in scanning relation with each code element, is uneconomical, in that it would require the provision of $np$ heads in the case of $p$ different magnitudes each represented by $n$ code elements. In addition to its cost, such an arrangement, as well as the somewhat less expensive arrangement using only $n$ (or $p$) separate reading heads bodily displaceable across the medium to $p$ (or $n$) successive position, is unsatisfactory because the code elements are found in practice to depart somewhat from their true requisite positions across the width of the record. This may be due to any of various causes which may include a slight "yawing" motion of the record film or tape as it is fed during recording or reading operations, small relative transverse displacements between corresponding code elements in the words across the tape, and/or variations in length of different code elements off standard.

It is therefore an object of this invention to provide an improved reading system for digital code. Another object is to provide an improved system for translating parallel into serial code for convenient serial entry of the coded data into any of various types of data-utilizing or data-processing equipment. A further object is to provide such a system which will be comparatively simple and inexpensive to construct and maintain. An important object lies in providing such a translating or reading system which will consistently yield accurate output information regardless of imperfect positioning, spacing and dimensioning of the individual parallel code elements recorded across the medium.

According to one aspect of the invention, there is provided a system for reading a digital code record of the type wherein code words are recorded in longitudinally displaced relation along a longitudinally displaceable record medium, each word consisting of a number of code elements recorded transversely across the medium, which system comprises a scanner displaceable transversely across the medium, means for imparting a longitudinal displacement to the medium relative to the scanner and means for imparting a transverse displacement to the scanner relative to the medium, whereby the scanner will serially scan all the code elements of each successive word of the record, means connected to the scanner for emitting electric output pulses corresponding to the code elements scanned by it, and means for constraining said emitting means to emit an output pulse only at the time the scanner is positioned at substantially the midpoint of the corresponding code element.

According to another aspect of the invention, the system may comprise a main scanner, means imparting to the medium and main scanner a transverse and a longitudinal relative displacements for serially scanning the successive code elements of the successive words of the medium, an auxiliary record comprising elements uniformly displaced in the said transverse direction of the main record medium, an auxiliary scanner, said transverse displacement between the record medium and main scanner simultaneously imparting an identical relative displacement between said auxiliary record and auxiliary scanner, and means for emitting an electric output pulse from said system on occurrence of a coincidence between the scanning of a main code element by the main scanner and the scanning of a predetermined number of auxiliary code elements by the auxiliary scanner.

The above and further aspects, objects and advantages of the invention, as well as the characteristic features thereof, will appear as the description proceeds. The accompanying drawings illustrate one form of embodiment of the invention by way of example but not of limitation. In the drawings.

Figure 1:
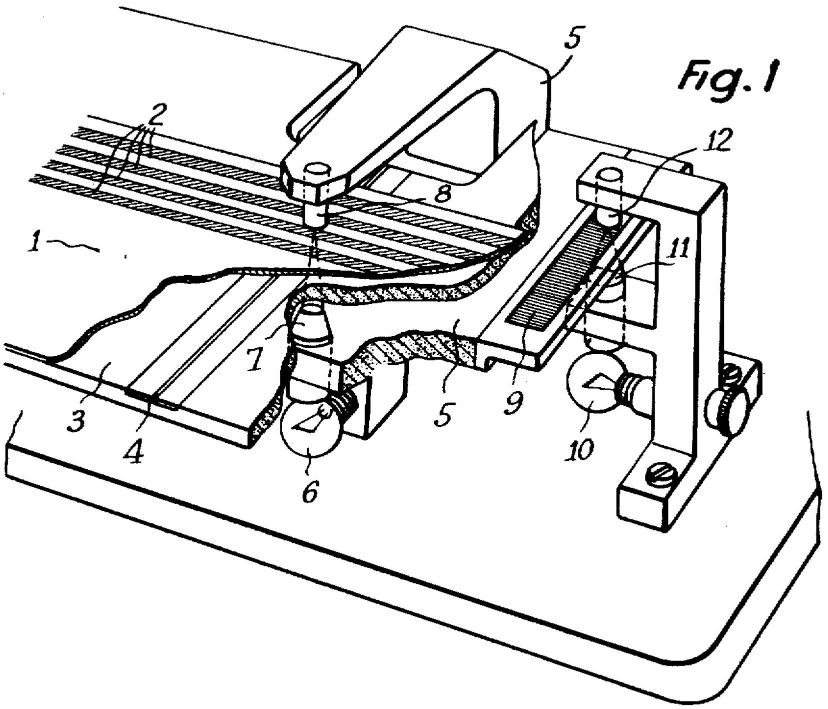
Fig. 1 illustrates the improved reading or scanning system as applied to a photographic record.
Figure 2:
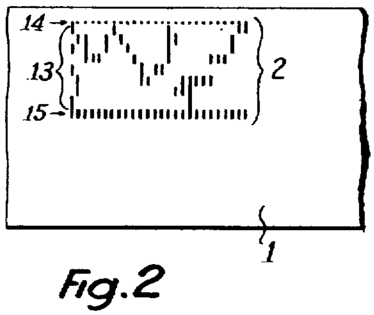
Fig. 2 is a larger-scale view of part of a typical word channel of the record.

Referring to Figs. 1 and 2, the system shown herein as an exemplary embodiment of the invention utilizes a record film 1 comprising a plurality of word channels such as 2. The film is arranged to be fed longitudinally by means not shown over a supporting platent 3 in which a slot 4 is formed transversely of the film. A reader or scanner unit 5 is mounted on a support for transverse reciprocatory displacement relative to the film and comprises a light source 6 and suitable optical system 7 adapted to produce an image of the source in the plane containing the slot 4, said image being in the form of a line normal to the slot. The scanner 5 further includes a photoelectric cell 8 disposed on opposite the side of the film 1 from the side where the source 6 is located. Suitable means, not shown, are provided for imparting correlated displacements to the film and to the scanner assembly 5.

Bodily displaceable with the scanner 5 is an auxiliary record 9 in the form of an optical grating, i.e. consisting of alternate opaque and transparent, uniformly spaced lines normal to the slot 4. This auxiliary record is scanned during its displacements by a stationarily mounted auxiliary scanner unit comprising a light source 10, optical system 11 and photo-electric cell 12. It will be understood that each of the two photo-cells, namely the main cell 8 and auxiliary cell 12, is arranged to deliver a voltage output whenever light from the related source 6 or 10 is allowed to impinge on the cell due to the presence of a transparent portion of the record 1 or 9 being scanned at the instant under consideration. Each elementary code position in a word recorded on the film 1 may be considered as representing for example a binary digit 0 or 1 according as that position does not or does bear a code element recorded on it (or vice versa). Each such code element may therefore be described as a "bit."

Fig. 2 illustrates on an enlarged scale a portion of one typical word track or channel. The code shown herein by way of example is an eight-element, semi-binary code, adapted to represent 100 digital values of a variable magnitude. The eight parallel code elements or bits serving to represent each numerical value are designated by 13 and constitute a "word." Ahead of the initial bit of each word there is a "start-of-word" code element or bit 14, which may be equal in width to one third the width of a numerical bit 13. Following the last numerical bit 13 of the word there is an "end-of-word" code element 15. Preferably the end-of-word bit 15 serves simultaneously to check the parity of the code so as to indicate transmission errors, according to conventional procedure. The spacing between adjacent opaque lines on the auxiliary record or grating 9 equals herein the width of a start bit 14. In other words, the correct pitch or midpoint-to-midpoint spacing between adjacent code elements or bits on the main record corresponds to three times the pitch spacing of the elements on the auxiliary record. It will be understood that the ratio as just defined may be selected at a value different from three if desired. The respective word tracks such as 2 are spaced by suitable blank intervals as indicated in Fig. 1.

Figure 3:
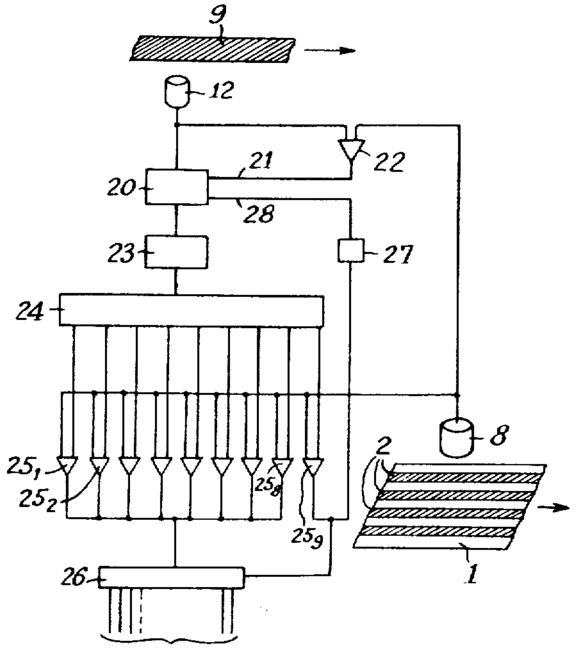
Fig. 3 is a functional diagram of the system illustrating the logical circuits thereof in block form.

Referring to Fig. 3, the output pulses delivered by the auxiliary photo-cell 12 as the auxiliary record 9 is displaced in scanning relation to the stationary scanner unit during transverse displacement of the main scanner assembly 5, are applied to the input of a switch or gate 20. This may take the form of any suitable electronic circuit adapted to pass a voltage from its input to an output when the gate has been opened due to the application of a voltage pulse to a first line 21 connected to the gate, and to block the passage of voltages from its input to its output when the gate has been closed by application of a voltage pulse to another line 28 connected to the gate. The function of lines 21 and 28 to open and close the gate will be described later. Connected to the output of gate 20 is the input of a three-stage counter or ternary divider 23, which counts the pulses applied to it and emits an output pulse for every third input pulses received by it. Thus it is seen that during the open periods of gate 20, counter 23 will emit an output pulse every time the auxiliary scanner has sensed three successive elements on the auxiliary record 9.

The output of counter 23 is applied to the input of a nine stage stepping register 24, having nine outputs respectively connected to the nine stages of it. The register is so constructed that a pulse is emitted over each of its nine outputs in succession at each successive pulse received by the register from counter 23, this stepping output being repeated cyclically with each consecutive series of nine pulses received by the register.

The nine outputs of stepping register 24 are respectively applied as first inputs to a set of nine coincidence circuits (logical "and" circuits) $25_1$, $25_2$, . . . $25_9$, each further having a second input; all these second inputs are connected in parallel to the output of the main photocell 8. As will be more clearly understood presently, the nine coincidence circuits $25_1$ to $25_9$ emit pulses in succession, at times coinciding with the scanning of the eight successive numerical bits and the end-of-word or check bit of each word, as scanned by the main scanner 5. Since each of the coincidence circuits can only emit an output pulse when both of its inputs are simultaneously energized, and since moreover the first input of each of these circuits is energized on occurrence of every third auxiliary bit sensed by the auxiliary scanner, as explained above, it will be evident that the sequence of pulses emitted from the nine coincidence circuits can be so timed as to correspond substantially with the midpoints of the successive bits of each word on the main record, regardless of any errors in the relative positioning, spacing and dimensioning of said bits, within a reasonable range.

In the embodiment shown, the outputs of the first eight coincidence circuits $25_1$ to $25_8$ are connected together and applied in parallel to a common output line, which herein is connected to the movable contact arm of a multi-position switch schematically indicated at 26. The switch is provided with as many contact positions as there are words recorded in parallel, transversely across the record film, e.g. there are as many contact positions as there are different variable magnitudes simultaneously recorded. From each contact position of switch 26 there extends a separate line which may be connected to any suitable output unit, e.g. card punching machine or computer memory. The output from the ninth concidence circuit $25_9$ is in turn connected to the switch stepping mechanism, for example to an electromagnet adapted when energized to displace the switch arm from one to the next contact position. With this arrangement therefore, the eight parallel code indications forming the numerical portion of each word on the record are transmitted as serial pulse code indications over a corresponding output line issuing from switch 26, while the last code indication of each word, that is the end-of-word or check bit, causes the switch to step to its next position so that the next parallel word, corresponding to a different variable magnitude, will be transmitted over a different output line.

To ensure that the initial code element of each word is transmitted at the correct time, the input switch or gate device 20 is operated jointly by the start and end-of-word bits in the following manner. The gate is opened to permit the passage of pulse, by the application to it of a pulse from line 21 which is connected to the output of a coincidence circuit 22 whose two inputs are respectively connected to the outputs of main photo-cell 8 and auxiliary photo-cell 12. The gate 20 is closed to block the passage of pulses, by the application of a pulse to it over line 28 which is connected, by way of a delay network 27, to the output of the ninth output coincidence circuit $25_9$. The delay introduced by network 27 is selected to correspond to the time required by the main scanner to scan the check bit 15. In this way, the gate 20 operates to prevent the transmission to the counter 23 of auxiliary signals occurring during the idle periods between the successive words of the main record.

While the operation of the invention will be quite clear from the foregoing disclosure, it appears desirable to include herein additional details concerning some numerical aspects of the operation of the invention and the selection of the parameters involved in the design of the system.

Generally speaking, if we designate by $n_i$ the number of code elements or bits present in the $i$-th word track or channel of the record and by $q$ the constant number of auxiliary pulses scanned by the auxiliary scanner during the interval from the midpoint of one code element of the $i$-th word to the midpoint of the adjacent code element.

Then the invention may be said to consist in the fact that the consecutive bits of the $i$-th word are positively read out after respective counts of $q_0$; $(q_0+q)$; $(q_0+2q)$; . . . $[q_0+(n_i-1)q]$ auxiliary pulses by the auxiliary scanner. In the above, $q_0$ represents the number of auxiliary pulses counted from the instant of occurrence of the start-of-word pulse 14, to the instant that the initial numerical bit of the word is read out. If the uniform spacing or pitch between the auxiliary pulses for the $i$-th word is $a_i$, then the pitch or spacing between the code elements of said $i$-th word will equal $qa_i$. Usually the pitch between auxiliary pulses will be the same for all the words, i.e. will equal a common constant $a$, so that the pitch between the code elements of all the words will then equal $qa$. Essentially the auxiliary system is arranged to deliver the constant number $q$ of auxiliary pulses every time the main scanning system has scanned one elementary code interval of a word. For reasons of simplicity, the initial count $q_0$ of auxiliary pulses counted up to the time the initial word bit is read out, is selected equal to $q$. This was assumed to be the case in the description of the exemplary embodiment above. For this purpose, the start-of-word bit 14 should be made equal in width to the value $$\frac{q-1}{2}a$$

so that the main scanning system will substantially be positioned at the midpoint of each successive word bit every time the auxiliary system has delivered $q$, $2q$, $3q$, . . . $nq$ pulses as counted from a pulse delivered by the leading end of the start-of-word bit. To show the truth of this statement, consider the initial numerical bit 13 of a word; the midpoint of this word is spaced a distance $$\frac{q-1}{2}a+\frac{qa}{2}=qa-\frac{a}{2}$$

from the leading end of the start bit. Now, the $q$-th auxiliary pulse is produced as the main scanner is positioned a distance intermediate between $(q-1)a$ and $qa$ from said leading end; thus, if an auxiliary pulse is produced immediately after the start pulse, such auxiliary pulse will be the first actually to be counted, and the $q$-th auxiliary pulse will be counted as the main scanner is positioned a distance $(q-1)a$ from the leading end of the start pulse; if however an auxiliary pulse is produced just before the start pulse, that auxiliary pulse will not be counted and the $q$-th auxiliary pulse will be counted as the main scanner is positioned a distance $qa$ away from the leading end of the start pulse. In every case therefore, the $q$-th auxiliary pulse occurs at a time when the main scanner is positioned at or about the midpoint of the initial numerical bit of a word, the maximum positional error being $$\pm\frac{a}{2}$$

Since the width of a bit is substantially $qa$, it will be seen that the degree of approximation increases proportionally as $q$ is increased. Since the auxiliary scanner is designed to deliver exactly $q$ pulses when the main scanner has been displaced a width $qa$, the degree of approximation will remain the same regardless of the number $n$ of code elements in the word. On this basis therefore it is sufficient that the value of the factor $q$ be selected as equal to or greater than 2.

In some cases however it can happen that the width of a word record across the record medium is actually larger or smaller than the normal width for which the auxiliary system was predetermined. Such a situation may occur for example in the case of photographic records, where the widths of different recorded words may well vary homothetically with respect to the widths they should normally have. In such cases the factor $q$ should be selected both with regard to the maximum error liable to occur in the position of the midpoint of the initial numerical bit, and with regard to the maximum error in total word width. The correct value of the $q$ factor for such cases may readily be predetermined by means of a simple computation on the following lines.

Assume a record has undergone a variation of $h\%$ with respect to the standard dimension for which the auxiliary system was designed, then the leading and trailing edges of the $n$-th bit are respectively displaced by the following distances from the leading edge of the start bit:

$$\text{Leading edge: }\left[\frac{q-1}{2}a+(n-1)qa\right]\left(1+\frac{h}{100}\right)$$

$$\text{Trailing edge: }\left[\frac{q-1}{2}a+nqa\right]\left(1+\frac{h}{100}\right)$$

According to the invention, the $n$-th bit is read out as the main scanner is displaced from the leading edge of the start bit by a distance intermediate between the values $(nq-1)\,a$ and $nqa$. In order to ensure correct read-out therefore, it is necessary that this range of distances within which the main scanner may be positioned, should be contained within the range over which the $n$-th bit extends. In other words, we obtain the set of two conditions:

$$(nq-1)a>\left[\frac{q-1}{2}a+(n-1)qa\right]\left(1+\frac{h}{100}\right)$$

$$nqa<\left[\frac{q-1}{2}a+nqa\right]\left(1+\frac{h}{100}\right)$$

This can be rewritten:

$$\frac{nq}{nq+\frac{q-1}{2}}<1+\frac{h}{100}<\frac{nq-1}{nq-\frac{q+1}{2}}$$

or again:

$$\begin{cases}\dfrac{1}{q}<(1+2n)\dfrac{h}{100+h}\\[2mm]\dfrac{1}{q}<1-2(n-1)\dfrac{h}{100-h}\end{cases}$$

This set of conditions makes it possible, knowing the number $n$ of code elements per word and the maximum percentage error $h$ in worth width, to predetermine a minimum value for the factor $q$ such that the system of the invention will provide an accurate serial code output in all circumstances. For example, in case of a ten-bit code ($n=10$) and a maximum variation in word width equal to 4 percent ($h=4$), then the bottom inequality of the above set yields the condition $q>4$. Thus, a satisfactory value for the factor $q$ would in this case equal the value 5. In such case the counter 23 of Fig. 3 would of course have to be a five-stage rather than a 3-stage as described hereinabove.

It will be understood that many other departures from the details of embodiment illustrated and described hereinabove may be effected without exceeding the scope of the present invention. The specific embodiment shown was devised primarily for use in connection with the optical method of digital code recording, disclosed in the applicant's patent application No. 663,539 of June 4, 1957 (convention date June 12, 1956). However, it will be evident that the invention is not restricted to such an application, and that it may be embodied in any series-parallel digital coding system, whatever the nature of the record medium used, such as photographic film, magnetic tape, magnetic drum, perforated tape, etc. The logical circuitry depicted in the functional diagram of Fig. 3 may of course be modified depending on specific requirements, and the components of the circuit may be embodied in electric and/or electronic equipment of various types well-known in the art. Similarly, the mechanical details of the system shown in Fig. 1 may be altered. Various codes may be used in recording the data on the record medium, including binary, binary-decimal, or other types of code susceptible of series-parallel transcription.

What I claim is:

1. In a digital code reading system, a main record medium driven longitudinally having code words recorded in longitudinally displaced relation thereon, each word comprising a number of main code elements recorded in transversely displaced relation across said record medium, a main code reader driven to carry out transverse scanning displacements relative to the main record medium for serially scanning the successive main code elements of successive words along the main record medium, an auxiliary record medium comprising a predetermined number of auxiliary code elements uniformly spaced in transversely spaced relation across said auxiliary record medium and the spacing thereof substantially corresponding to a submultiple of the spacing between midpoints of adjacent one of said main code elements, an auxiliary reader for reading said auxiliary record and operable to scan the auxiliary record medium cyclically in synchronism with successive, individual transverse scanning displacements of the main record medium, means operably connected to the auxiliary reader for counting the auxiliary code elements scanned, means connected with the main reader for generating electric pulses corresponding to the main code elements scanned, means for disabling the generating means, and means cooperative with the counting means for enabling said pulse generating means every time that the auxiliary reader has scanned a predetermined number of auxiliary code elements as counted by said counter means and including means effective to cause the pulse generating means when enabled to emit pulses in correspondence with the scanning of the main code elements.

2. In a digital code reading system, a main record medium driven longitudinally having code words recorded in longitudinally displaced relation thereon, each word comprising a number of main code elements recorded in transversely displaced relation across said record medium, marker elements on said main record medium for indicating the start of each word, a main code reader driven to carry out transverse scanning displacements relative to the main record medium for serially scanning the successive main code elements of successive words along the main record medium, an auxiliary record medium comprising a predetermined number of auxiliary code elements uniformly spaced in transversely spaced relation across said auxiliary record medium and the spacing thereof substantially corresponding to a submultiple of the spacing between the midpoints of adjacent ones of said main code elements, an auxiliary reader reading said auxiliary record and operable to scan the auxiliary record medium cyclically in synchronism with the successive individual transverse scanning displacements of the main record medium, means operably connected to the auxiliary reader for counting the auxiliary code elements scanned, means operably connected with the main reader for generating electric pulses in response to the main code elements scanned, means for disabling the pulse generating means, and means enabling said pulse generating means every time that the auxiliary reader has scanned a predetermined number of auxiliary code elements as counted by said counter means after the scanning of each marker element.

3. In a digital code reading system, a main record medium driven longitudinally having a code words recorded in longitudinally displaced relation thereon, each word comprising a plurality of main code elements recorded in transversely displaced relation across the record medium, a main code reader driven to carry out transverse displacements relative to the main record medium for serially scanning the successive main code elements of successive words, a driven auxiliary record medium extending transversely of the direction of movement of said main record medium comprising a predetermined number of auxiliary code elements uniformly spaced in transversely spaced relation across said auxiliary record medium and the spacing thereof substantially corresponding to a submultiple of the spacing between midpoints of adjacent ones of said main code elements, an auxiliary reader for reading said auxiliary record and driven to carry out a cyclical scanning movement in synchronism with said main transverse scanning displacement thereby to cause the auxiliary reader to scan the auxiliary record medium repetitively in synchronism with the successive individual transverse scanning displacements of the main record medium, and an electric pulse generating circuit having counter and coincidence networks connected with said main and auxiliary readers and including means cooperative with said networks for generating an output pulse in occurrence of a coincidence between the scanning of each main code element by the main reader and the scanning of the last of a predetermined number of auxiliary code elements by the auxiliary reader.

4. In a digital code reading system, a main record medium driven longitudinally having code words recorded in longitudinally displaced relation thereon, each word comprising a plurality of main code elements recorded in transversely displaced relation across the record medium, a check code element recorded on said medium following the last code element of each word, a main code reader driven to carry out transverse scanning displacement relative to the main record medium for serially scanning the successive main code elements of successive words along the main record medium, a driven auxiliary record medium comprising a predetermined number of auxiliary code elements uniformly spaced in transversely spaced relation across said auxiliary record medium and the spacing thereof substantially corresponding to a submultiple of the spacing between the midpoints of adjacent ones of said main code elements, an auxiliary reader for reading said auxiliary record and driven to carry out a cyclical scanning movement in synchronism with said main transverse scanning displacements thereby to cause the auxiliary reader to scan the auxiliary record medium repetitively in synchronism with the successive individual transverse scanning displacements of the main record medium, an electric pulse generating circuit having counter and coincidence networks connected with said main and auxiliary readers and including means cooperative with said networks for generating an output pulse in occurrence of a coincidence between the scanning of a main reader and the scanning of the last of a predetermined number of auxiliary code elements by the auxiliary reader, and means for disabling said pulse generating means during scanning of a check code element on the main record medium.

5. In a digital code reading system, a main record medium driven longitudinally having code words recorded in longitudinally displaced relation thereof, each word comprising a plurality of main code elements recorded in transversely displaced relation across the record medium, start code elements recorded in said record medium ahead of the beginning of each word, check code elements recorded in said record medium following the end of each word, a main code reader driven to carry out transverse displacement relative to the main record medium for serially scanning the successive main code elements of successive words along the main record medium, a driven auxiliary record medium comprising a predetermined number of auxiliary code elements uniformly spaced in transversely spaced relation across said auxiliary record medium and the spacing thereof substantially corresponding to a submultiple of the spacing between the midpoints of adjacent ones of said main code elements, an auxiliary reader for reading said auxiliary record and driven to carry out a cyclical scanning movement in synchronism with said main transverse scanning displacements thereby to cause the auxiliary reader to scan the auxiliary record medium repetitively in synchronism with the successive individual transverse scanning displacements of the main record medium, an electric pulse generating circuit including counter and coincidence networks connected with said main and auxiliary readers and including means cooperative with said networks for generating an output pulse in occurrence of a coincidence between the scanning of a main code element by the main reader and the scanning of the last of a predetermined number of auxiliary code elements by the auxiliary reader, and gate means connected in said pulse generating circuit and responsive to said main scanner for passing said pulses when a start element is scanned and for blocking said pulses when a check code element is scanned.

6. In a system according to claim 5, in which said means cooperative with said networks comprises a stepping register connected in said electric pulse generating circuit and having a number of outputs corresponding to the number of code elements per word, said register being connected to said counter network for emitting a pulse over each successive register output every time the counter network has counted a predetermined number of auxiliary pulses generated by said pulse in response to scanning of the auxiliary code elements by said auxiliary reader, a multiposition switch connected to all said register outputs for transmitting the pulses being transmitted thereon, and an additional output from said register connected to said multiposition switch for advancing the switch from one to another of its positions after all of the code elements of a word have been scanned.

References Cited in the file of this patent

UNITED STATES PATENTS

| | | |
|---|---|---|
| 2,648,589 | Hickman | Aug. 11, 1953 |
| 2,782,398 | West et al. | Feb. 19, 1957 |
| 2,808,986 | Stone et al. | Oct. 8, 1957 |